L. L. SAVOIE.
SPRING WHEEL.
APPLICATION FILED MAR. 10, 1921.
1,416,516.
Patented May 16, 1922.
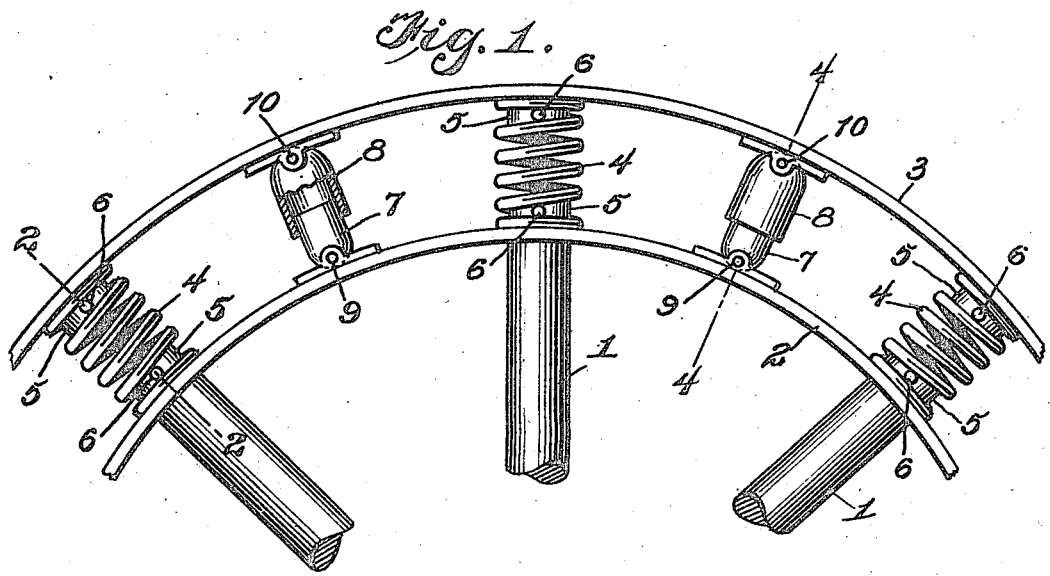
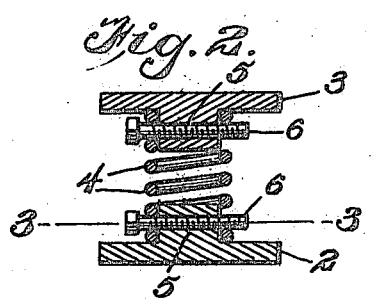
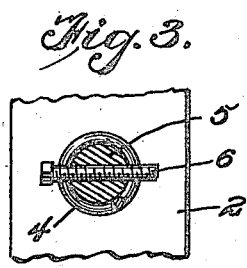
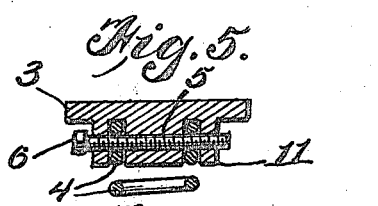
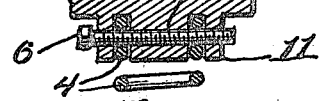
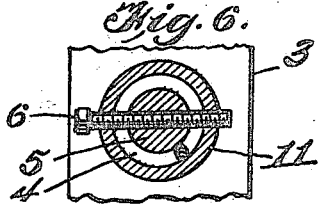
Inventor
L. L. Savoie
By C. C. Hines
Attorney

UNITED STATES PATENT OFFICE.

LEO L. SAVOIE, OF NEW ORLEANS, LOUISIANA.

SPRING WHEEL.

1,416,516. Specification of Letters Patent. Patented May 16, 1922.

Application filed March 10, 1921. Serial No. 451,158.

*To all whom it may concern:*

Be it known that I, LEO L. SAVOIE, a citizen of the United States, residing at New Orleans, in the parish of Orleans and State of Louisiana, have invented new and useful Improvements in Spring Wheels, of which the following is a specification.

This invention relates to spring wheels intended to be used in connection with automobiles and other vehicles and to provide a cushioning surface which will effectually absorb the shocks and jars falling upon the wheel without the necessity of using a pneumatic tire.

The particular objects of the invention are, first, to provide a novel mode of mounting a series of cushioning springs between a fixed inner rim and an outer movable rim, and, second, to provide improved means for allowing the movable rim to have adequate radial and circumferential movements, while reducing such motions to safe limits.

The invention consists of the features of construction, combination and arrangement of parts, hereinafter fully described and claimed, reference being had to the accompanying drawing, in which:

Figure 1 is a side elevation of a portion of a vehicle wheel constructed in accordance with my invention.

Figure 2 is a cross-section on the line 2—2 of Figure 1.

Figure 3 is a detail section on line 3—3 of Figure 2.

Figure 4 is a cross-section on line 4—4 of Figure 1.

Figure 5 is a view similar to Figure 2, showing a modification.

Figure 6 is a detail transverse section thereof.

Referring to the drawing, 1 designates the spokes of the wheel, carrying at their outer ends a fixed inner rim member 2, arranged in spaced relation to an outer movable rim member 3. The rim member 2 is fixed in any suitable manner to the spokes, and said rim members 2 and 3 consist of annular bands of spring steel or other suitable material.

Disposed between the rim members 2 and 3 is an annular series of cushioning springs 4. The springs 4 are arranged radially of the wheel and in longitudinal alinement with the respective spokes 1. Each spring 4 is of the coil type, and the outer and inner end portions of each spring are arranged to embrace bosses 5 whereby the ends of the spring are centered and maintained in proper relationship. As shown, the construction is such that the terminal coils of each spring surround the bosses and serve as retaining members, allowing the remaining coils of the spring to not only have free movement in the plane of the axis of the spring, for radial cushioning motion, but also permitting the intermediate coils to have a certain range of motion in a direction circumferentially of the wheel, by which action the outer rim section 3 is permitted to move freely toward and from the rim section 2 without liability of the spring coils interfering and binding. The studs 5 are provided with transverse threaded openings for the reception of screws or like fastening members, whereby the retaining coils are held in position to prevent displacement of the springs, the construction thus being such that the springs may be quickly and conveniently fastened in place and also released to permit independent removal of any spring from either rim, as well as to permit disassociation of the rim members when occasion requires. By having the terminal coils of the springs externally surround the retaining bosses, a material advantage is gained over fitting the ends of the springs in retaining sockets, since such bosses permit free relative angular movements of the ends of the springs with relation to each other, which would be prevented if the ends of the springs were confined within sockets. The use of the fastening screws also ensures the positive retention of the spring ends against displacement, while permitting of their ready and convenient removal when occasion requires.

The springs 4 are preferably arranged in alinement with the spokes, and therefore at some considerable distance apart, in order to diminish resistance of any of the springs to compression and expansion of the other springs, necessary in the inward and outward movements of portions of the rim section 3. In order to stay and properly support the rim sections between the springs, flexible stay members are provided, which also serve as limitation devices restricting the circumferential movements of the rim section 3 with respect to the rim section 2. Each of these stays is of the telescopic type, comprising a plunger member 7 loosely fitted for sliding and pivotal movements within a bell-shaped socket member 8, said plunger and socket members being respectively hinged or pivoted, as indicated, at 9 and 10, to the respective rim sections 2 and 3. This sliding and pivotal connection of the telescopic members allows the rim section 3 to have rotary movement with respect to the rim section 2, and also permits the two members 7 and 8 to assume certain restricted angular positions without binding in a direction circumferential of the wheel. The pivot members 9 and 10 are arranged transversely of the rim members and allow the telescopic stays to have flexing movements in a circumferential direction, such movements, in addition to their telescopic movements, being sufficient to limit the circumferential movement of the rim section 3 while permitting sufficient circumferential movement to avoid resistance to a proper cushioning action of the springs.

In Figures 5 and 6 I have shown a slight modification of the construction in which there is disclosed the use of an annular guard 11 surrounding each boss 5 and apertured also to receive the retaining screw 6, said guard and boss being spaced to provide a receiving groove for the retaining coil of the spring, which groove is wide enough to permit the coil to have angular play on the boss while limiting such movement. These and other modifications falling within the spirit and scope of the invention may be made and also any suitable means for covering and enclosing the parts to protect the same from the access of dirt, mud and other foreign particles may be employed.

Having thus fully described my invention, I claim:

A spring wheel having spokes, an inner fixed rim, an outer movable rim, coiled cushioning springs between said rims, and jointed stays connecting the rims and arranged in alternation with the springs, each stay comprising a pair of members telescopically engaged with each other, said members being hinged to the rims.

In testimony whereof I affix my signature.

LEO L. SAVOIE.